US006379415B1

(12) United States Patent
Garten et al.

(10) Patent No.: US 6,379,415 B1
(45) Date of Patent: Apr. 30, 2002

(54) METHOD FOR FEEDING GRANULAR SOLIDS INTO METAL MELTS

(75) Inventors: Lutz Garten, Gevelsberg; Klaus Keller, Dortmund; Wilfried Stein; Karl Stein, both of Hagen, all of (DE)

(73) Assignee: Stein - Industrie-Anlagen Inh. Christel Stein, Gevelsberg (DE)

( * ) Notice: Subject to any disclaimer, the term of this patent is extended or adjusted under 35 U.S.C. 154(b) by 0 days.

(21) Appl. No.: 09/381,440

(22) PCT Filed: Mar. 17, 1997

(86) PCT No.: PCT/EP97/01329

§ 371 Date: Nov. 29, 1999

§ 102(e) Date: Nov. 29, 1999

(87) PCT Pub. No.: WO98/41658

PCT Pub. Date: Sep. 24, 1998

(30) Foreign Application Priority Data

Sep. 21, 1995 (DE) .......................................... 195 35 014

(51) Int. Cl.$^7$ ............................................... C22B 9/10
(52) U.S. Cl. .......................... 75/10.46; 75/305; 75/467; 266/225
(58) Field of Search ..................... 75/305, 467, 10.46; 266/225

(56) References Cited

U.S. PATENT DOCUMENTS

| | | | | | |
|---|---|---|---|---|---|
| 4,612,043 A | * | 9/1986 | Gray et al. | .................... | 75/509 |
| 4,664,701 A | * | 5/1987 | Royzman | ................... | 75/10.42 |
| 4,863,684 A | * | 9/1989 | Hubbard | | |
| 5,135,572 A | * | 8/1992 | Ibaraki et al. | ................. | 75/502 |
| 5,366,539 A | * | 11/1994 | Abele et al. | ................... | 75/532 |
| 5,368,631 A | * | 11/1994 | Rossborough et al. | ........ | 75/533 |
| 5,417,740 A | * | 5/1995 | Galperin et al. | .............. | 75/528 |

FOREIGN PATENT DOCUMENTS

| | | | | | |
|---|---|---|---|---|---|
| DE | 2408363 A | * | 10/1974 | | |
| DE | 2528672 A | * | 2/1976 | | |
| DE | 19535014 A | * | 3/1997 | | |
| JP | 62218508 A | * | 9/1987 | .................. | 75/467 |
| JP | 02221317 A | * | 9/1990 | .................. | 75/525 |
| JP | 02225613 A | * | 9/1990 | .................. | 75/543 |

OTHER PUBLICATIONS

Scheidig et al: "Betriegserfahrungen mit einer neuen Generation von Anlagen zum Kohlenstaubeinblasen in den Hochofen" Stahl Und Eisen, vol. 105, No. 25/26, Dec. 16, 1985 pp. 1437–1441.*
Patent Abstracts of Japan, vol. 006, No. 202 (C–129), Oct. 13, 1982 & JP 57 110610 A (Kawasaki Seitetsu KK), Jul. 9, 1982.*
Patent Abstracts of Japan, vol. 004, No. 084 (M–016), Jun. 17, 1980 & JP 55 042122 A (Kawasaki Steel Corp), Mar. 25, 1980.*
Krauss: "Verfahren zur Pulverinjektion in Stahlschmelzen" Neue Utte., vol. 24, No. 6, Jun. 1979, Leipzig De, pp. 217–222.*
Design of Pneumatic Conveying Systems, by S.L. Soo, *Journal of Powder & Bulk Solids Technology*, 4 (1980) 2/3: 33–43 2:26–2:36.

* cited by examiner

Primary Examiner—Roy King
Assistant Examiner—Tima McGuthry-Banks
(74) Attorney, Agent, or Firm—Flynn, Thiel, Boutell & Tanis, P.C.

(57) ABSTRACT

The invention relates to a method for feeding solids into metal or steel melts whereby granular solids required during the analysis adjustment are fed in a predetermined quantity into the turbulent regions of the metal melt in a dense flow process by means of a pneumatic conveying device in order to achieve a high output while avoiding expensive and complex measures associated with lances and capital-intensive investments for injection devices and lance-moving devices.

33 Claims, 1 Drawing Sheet

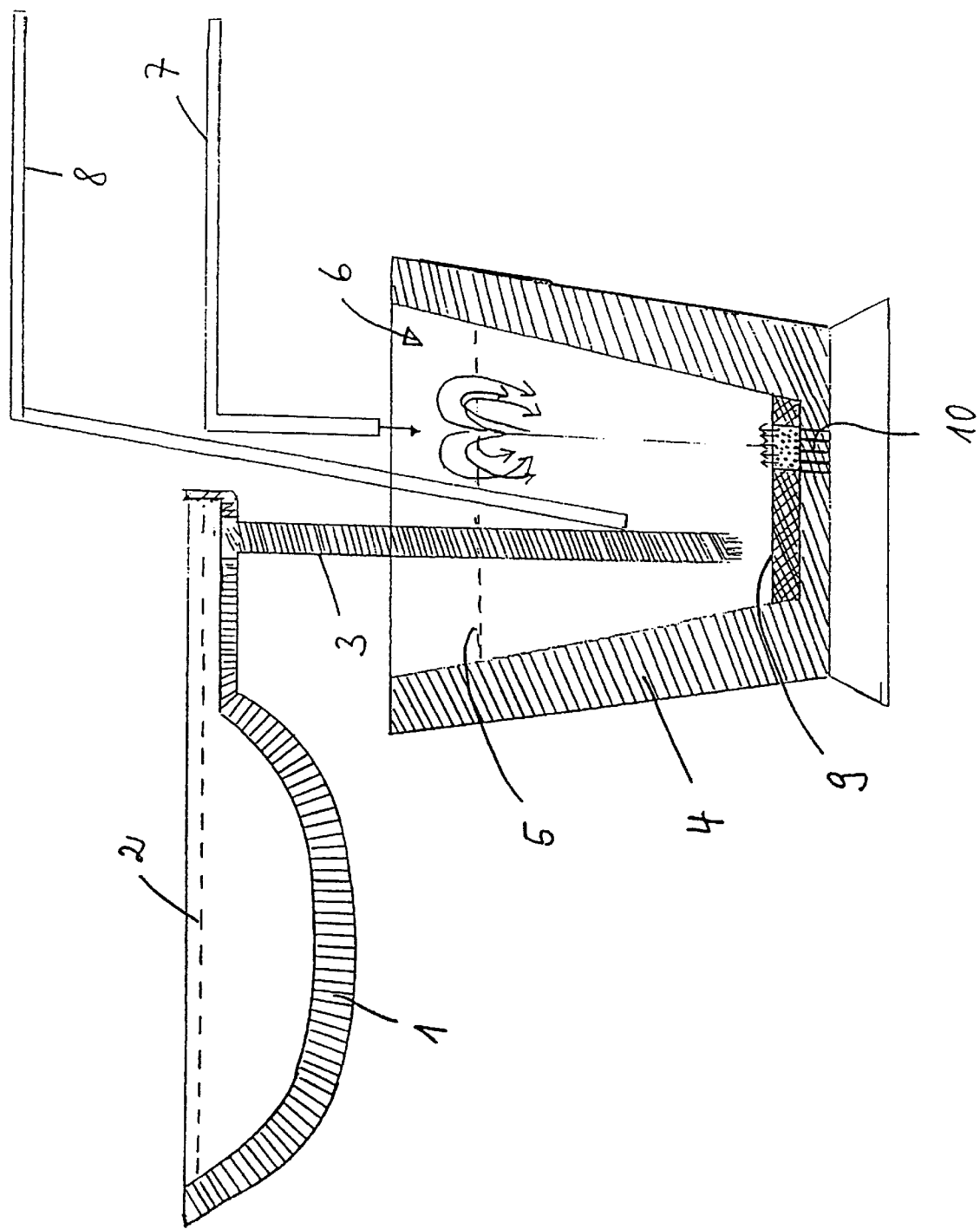

METHOD FOR FEEDING GRANULAR SOLIDS INTO METAL MELTS

The invention relates to a method according to the Oberbegriff of claim 1. Through this method, solids which are added for the analysis adjustment during the metal production, in particular steel production, in varying amounts outside of the actual metal-producing process, can be fed in a simple manner with a high accuracy in the analysis and a high output without using expensive auxiliary means like refractorily supplied lances or threading machines to the metal melts.

K. Scheidig et al discloses in "Stahl und Eisen" (Steel and Iron), Volume 105, No. 25–26 of Dec. 16, 1985, Pages 1437–1441, a pneumatic injecting of coal dust through the blast tuyere of a blast furnace by dense flow conveyance. The coal dust is thereby injected into the melt in measured quantities.

DE-OS 24 08 363 discloses a method for introducing finely divided particles of an aggregate into a liquid metal melt, while the melt is removed from the melt container.

Because of the increasing demands by the customers regarding the maintaining of analysis regulations by the steel producer and simultaneously continuously increasing competitive pressures, secondary metallurgy, that is the treatment of the liquid metals following the actual metal production in a converter or electric-arc oven, has increasingly gained in importance within the past years. During the course of this development the method, through which fine-granular, fluid solids, as they are needed for adjusting the end analysis of the liquid metal, in particular, steel in varying amounts, are added to the metal melt, receive more and more importance with regard to the prediction of the output, the accuracy of the analysis, method expenses, operation safety and flexibility.

The methods, which are used today, are:
a) addition utilizing the force of gravity during the tapping by means of sliding, flowing or manual feeding;
b) addition to the bath surface in the pan by means of conveyor systems or manually;
c) threading of fill wires by means of threading machines;
d) injection by dipping in refractorily supplied dipping lances such as, for example, the TN-method.

The addition methods mentioned under a) and b) are characterized by not being exactly predictable, a comparatively low output and insufficient accuracy, which results in the necessity of an increased consumption of alloy media and, relatively often, a one-time or repeated correction of the added amount. If the addition is done manually, then additional personnel are needed and, at the same time, the degree of the reproducibility of the analysis results is then comparatively even less.

By comparison, the methods mentioned under c) and d) are distinguished by a comparatively high accuracy and high reproducibility. However, the high costs are disadvantageous.

These high costs are caused in the methods according to c) by the production costs of the fill wire needed for the threading, in the methods according to d) by the specific refractory costs of the injection lances, which have a much shorter life because of the existing temperatures and the necessary treatment duration than, for example, the pure flushing lances.

The injection methods are moreover characterized by expensive, personnel-intensive lance procedures.

Further disadvantages of the up to now used methods are that the amounts of alloy media, which can be added per unit of time, are limited by the technical boundary conditions, for example, during threading or injecting. In addition, the metal melt experiences during the treatment according to the method according to c) and d) a stronger cooling off, when threading in fill wires, it is necessary to additionally melt the surrounding metal envelope and during injection, heat is additionally radiated to the refractory material of the lance and to the transport gas.

BRIEF DESCRIPTION OF THE DRAWING

The FIGURE illustrates the injection of materials into a melt according to a process of the present invention.

The purpose of the invention is to design a method of the abovementioned type in such a manner that with said method, fluid loose materials, which must be added in a suitable manner during the metal production, in particular the steel production, following the actual melting process in the converter or in the electric-arc oven for the correction of the analysis of the metal, are added in a simple manner to the liquid metal so that a high utilization of the ratio between the amount absorbed by the metal and the amount added is achieved without using expensive auxiliary devices such as, for example, refractorily supplied lances, lance-moving devices, threading machines and by avoiding the use of fill wires.

This purpose is attained according to the invention with the characteristics of claim 1. The injection can occur into the tapping beam of a converter or electric-arc oven utilized for the steel production during the tapping or into the impact area of the tapping beam of a converter or of an electric-arc oven in the casting ladle or during the ladle-metallurgical treatment following the melting process into the area of the flushing spot during the flushing treatment on the bath surface.

Fluid loose materials, as they are usually utilized during the metal production for analysis adjustment, are, for example carbonaceous materials for carburization, lead, aluminum, sulfur, ferroalloys, and others.

A condition for the use of the method of the invention is that these materials exist in a granular, injectable form. The grain size is thereby variable within certain limits but should, however, lie as much as possible below 3 mm in diameter for reasons of a quick dissolving of the materials in the metal.

The loose material is injected by means of a pneumatically operating injection system, for example, according to EP 0 164 436. The size of the pressure receptacle of the system depends essentially on the size of the production unit and is related to the amount of material to be injected per treatment. Usually a pressure receptacle with a 1,000 to 2,000 l capacity is used.

The loose materials to be injected can be supplied either through a closed system in silo trucks and storage silos on site, through big bags, sacks or smaller transport containers with a 1,000 or 1,500 l capacity. One or more intermediate receptacles are usually provided above the pressure receptacle as day bunkers in order to assure a quick filling of the injector after the end of the treatment.

The method of the invention, in addition, also provides the simultaneous or sequential addition of several different materials during the course of one treatment.

The filing process and the following pressure build-up in the injector are for this purpose automatically designed in such a manner that the injector is again ready to convey within the shortest period of time.

Thus, smaller amounts of various materials can either be added separately, timely stepped or can be removed by preselecting the fill amounts one after the other into the injector and can be injected in one single operating step.

The materials are added into the melt by means of injection through a lance 7, 8 and since the lance does not dip into the melt or comes into contact with same, simple steel pipes without coating are sufficient as lances. Wear hardly occurs and the lances can be used again as often as desired.

The place and the time of the addition can either be the clustered tapping beam 3 of the liquid metal during the tapping, the impact area 9 of the metal during the tapping in the ladle 4 or the flushing spot 6 on the bath surface 5 during the ladle treatment.

The injection lances 7, 8 are for this purpose positioned by means of a device of the method during the injection process in such a manner that at all times the same boundary conditions like distance from the bath surface, position on the bath surface, angle of inclination, etc. can be maintained.

It is thereby important that even when the bath level 5 changes, for example during the tapping process from an oven 1, at varying steel amounts 2 in the ladle 4 or caused by refractory wear, the optimum distance of the lance top from the bath surface 5 is safely maintained. The method utilizes thereby already existing measuring methods, for example, on the basis of a laser measurement, of ultrasound measurements, etc.

When adding into the tapping beam 3, a high injection rate must be utilized since this operation is limited in time. Usual tapping times of converters 1 lie between 5 to 7 minutes and of electric-arc ovens with eccentric bottom tapping at approximately 2 minutes.

In order to guarantee the carrying along of the injected solids by the tapping beam into the metal amount already tapped into the ladle or in the flushing spot area through the circulating effect into deeper regions of the metal melt, it is necessary to convey the solids in a dense flow. Suitable injectors are available for this.

By means of the dense-flow conveying, it is guaranteed that the stream of solids hits in a clustered form either the tapping beam 3, the impact area 9 of the tapping beam in the ladle or the flushing spot 6 during treatment in the ladle and the clustering of the stream of solids is thereby also still maintained at a distance of up to one meter from the end of the lance.

Thus, it is possible on the one hand to maintain the necessary distance of the lances 7, 8 from the liquid metal in order to protect the lances 7, 8 from wear and, on the other hand, the necessary precise working in the area of the tapping beam 3 or of the flushing spot 6 is needed only in this manner as the condition for a high output rate.

In addition, using the dense-stream conveying makes it possible to work with the least possible amounts of conveying gases. The method provides for the utilization of all gases known in the area of the metal-producing industry like argon, nitrogen, air or even carbon dioxide.

The advantages of the new method are that because of the dense-stream conveying, the costs for the transport gas are kept low, for example, when using argon or nitrogen, it is assured because of the small transport-gas amounts and the high conveying rate that no significant influence of the quality of the metal through the change of the nitrogen content of the liquid melt occurs.

When the solid material needed for the analysis adjustment is injected in the area of the flushing spot 6, then the absorption speed of the liquid metal for the injected solids does not only depend on the pure dissolving power of the melt for, for example, carbon or silicon, but is yet significantly reinforced through the mechanical effect of impacting the stream of solids in the area of the flushing spot in cooperation with the circulating effect.

Thus, it is assured that the injected solids during the moment of impact on the bath surface 5 are immediately, that is, without delay, either dissolved in the bath or transported deep into the inside of the melt where the dissolving power for the injected solid material has not yet been exhausted.

The distribution of the injected solid material and thus the concentration balance is effected by the circulating action of the flushing gas 10 introduced at the bottom. The homogeneity of the melt is thus guaranteed by means of a precise and regulated injection on the one hand and by the cooperation of the blowing impulse and circulating action on the other hand.

When the solids are injected into a tapping beam 3, then the carrying action of the clustered metal stream takes care of the transport of also large amounts of solids per unit of time into the already tapped amount of melt existing below in the ladle.

The angle, at which the stream of solids hits the tapping beam, should lie between 10 and 80°.

The method of the invention provides to couple computer-control of the movement of the injecting lance with the tipping movement of the converter or of the electric-arc oven 1 in order to assure that the tapping beam 3 and the injected stream hit centrally onto one another when the solids are supposed to be blown into the tapping beam.

When the solids are supposed to be blown into the impact area 9 of the tapping beam during the tapping, then the injection lance must be lifted corresponding with the rise of the bath level. This process can be controlled by means of coupling the respective final control element on the lance-moving device with the weighing system of the ladle carriage or other measuring systems for the weight detection. Also, a measuring of the bath-level height in the ladle is provided in the aforedescribed manner.

When the solids are blown in the area of the flushing spot 6 onto the bath surface during the ladle treatment, it has been proven advantageous to arrange the injection lance 7 vertically. This simplifies the positioning of the lance during the changing level of the bath surface 5. A condition for this is that the geometric arrangement of the flushing system in the ladle bottom is maintained.

The applications relate to the injection of a fine-granular carbonaceous material with approximately 88% C into the flushing-spot area of a casting ladle with 180 t tapping weight. It has been proven hereby that outputs of up to 300 kg/min carbonaceous material with a simultaneous good utilization, here as output in relationship to the increase of the carbon contents, can be achieved without any problems.

Also, the distance of the injection lance from the bath surface can be varied in wide ranges. Even in the case of a distance of up to one meter from the bath surface, a high utilization is assured.

It has been proven to be advantageous to continue to flush the ladle 4 after the treatment has ended. The melt is homogenized in this manner and carbon particles, which have not yet been dissolved, and which had already been transported to the inside of the bath by the circulating action of the flushing gas and the mechanical impulse of the injection stream, are dissolved in the melt. A further increase of the analyzed carbon content is connected therewith.

What is claimed is:

1. A method for introducing granular solids needed for metal manufacture into a metal melt following a melt process by means of a pneumatic conveying system having at least one lance with an outlet opening provided above the metal melt, characterized in that the granular solids are transported by a conveying gas in the form of a clustered stream through turbulent areas into deep areas of the melt into a tapping beam provided in the melt of a converter or of an electric-arc oven utilized for steel production during tapping.

2. The method according to claim 1, characterized in that the solids are injected by means of a simple steel pipe, the diameter of which lies between ½" and up to a maximum of 3".

3. The method according to claim 1, characterized in that the distance of the injection lance from the melt surface or from a tapping beam provided in the melt lies between 0.01 and 2.0 m.

4. The method according to claim 1, characterized in that argon, nitrogen, carbon dioxide or compressed air is used as a conveying gas.

5. The method according to claim 1, characterized in that the grain size of the injected solids is less than 10 mm.

6. The method according to claim 1, characterized in that several different solids are injected separately one after the other in several treatment steps.

7. The method according to claim 1, characterized in that several different solids are injected together in one treatment step.

8. The method according to claim 1, characterized in that the solids are injected by a simple steel pipe having a diameter of from 1 to 2".

9. The method according to claim 1, characterized in that the distance of the injection lance from the melt or from a tapping beam provided in the melt is from 0.1 to 1.00 m.

10. The method according to claim 1, characterized in that the grain size of the injected solids is less than 3 mm.

11. The method according to claim 1, wherein the turbulent areas are formed by a scavenging area or at the surface of the melt at which the clustered stream impacts.

12. A method for introducing granular solids needed for metal manufacture into a metal melt following a melt process by means of a pneumatic conveying system having at least one lance with an outlet opening provided above the metal melt, characterized in that the granular solids are transported by a conveying gas in the form of a clustered stream through turbulent areas into deep areas of the melt into an impact area of a tapping provided in the melt of a converter or of an electric-arc oven in a casting ladle.

13. The method according to claim 12, characterized in that the solids are injected by means of a simple steel pipe, the diameter of which lies between ½" and up to a maximum of 3".

14. The method according to claim 12, characterized in that the distance of the injection lance from the melt surface or from a tapping beam provided in the melt lies between 0.01 and 2.0 m.

15. The method according to claim 12, characterized in that argon, nitrogen, carbon dioxide or compressed air is used as a conveying gas.

16. The method according to claim 12, characterized in that the grain size of the injected solids is less than 10 mm.

17. The method according to claim 12, characterized in that several different solids are injected separately one after the other in several treatment steps.

18. The method according to claim 12, characterized in that several different solids are injected together in one treatment step.

19. The method according to claim 12, characterized in that the solids are injected by a simple steel pipe having a diameter of from 1 to 2".

20. The method according to claim 12, characterized in that the distance of the injection lance from the melt or from a tapping beam provided in the melt is from 0.1 to 1.00 m.

21. The method according to claim 12, characterized in that the grain size of the injected solids is less than 3 mm.

22. The method according to claim 12, wherein the turbulent areas are formed by a scavenging area or at the surface of the melt at which the clustered stream impacts.

23. A method for introducing granular solids needed for metal manufacture into a metal melt following a melt process by means of a pneumatic conveying system having at least one lance with an outlet opening provided above the metal melt, characterized in that the granular solids are transported by a conveying gas in the form of a clustered stream through turbulent areas into deep areas of the melt during a ladle-metallurgical treatment following the melt process in the area of a flushing spot during a flushing treatment.

24. The method according to claim 23, characterized in that the solids are injected by means of a simple steel pipe, the diameter of which lies between ½" and up to a maximum of 3".

25. The method according to claim 23, characterized in that the distance of the injection lance from the melt surface or from a tapping beam provided in the melt lies between 0.01 and 2.0 m.

26. The method according to claim 23, characterized in that argon, nitrogen, carbon dioxide or compressed air is used as a conveying gas.

27. The method according to claim 23, characterized in that the grain size of the injected solids is less than 10 mm.

28. The method according to claim 23, characterized in that several different solids are injected separately one after the other in several treatment steps.

29. The method according to claim 23, characterized in that several different solids are injected together in one treatment step.

30. The method according to claim 23, characterized in that the solids are injected by a simple steel pipe having a diameter of from 1 to 2".

31. The method according to claim 23, characterized in that the distance of the injection lance from the melt or from a tapping beam provided in the melt is from 0.1 to 1.00 m.

32. The method according to claim 23, characterized in that the grain size of the injected solids is less than 3 mm.

33. The method according to claim 23, wherein the turbulent areas are formed by a scavenging area or at the surface of the melt at which the clustered stream impacts.

* * * * *